May 12, 1970   HOROYUKI MORI   3,512,068
SPEED CONTROLLING APPARATUS FOR SMALL D.C. MOTOR
Filed April 18, 1967
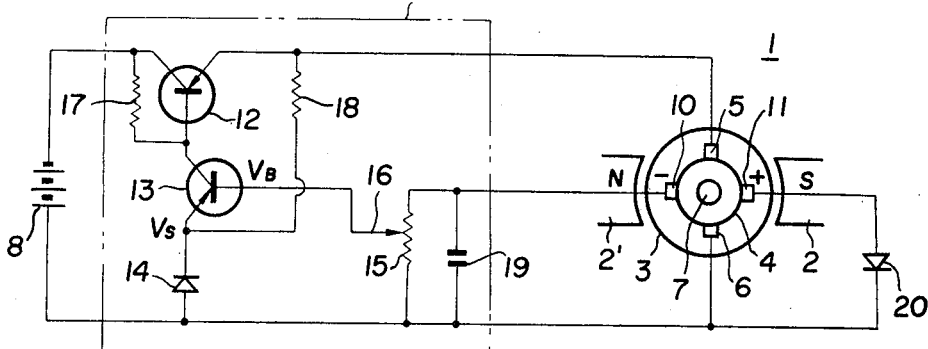
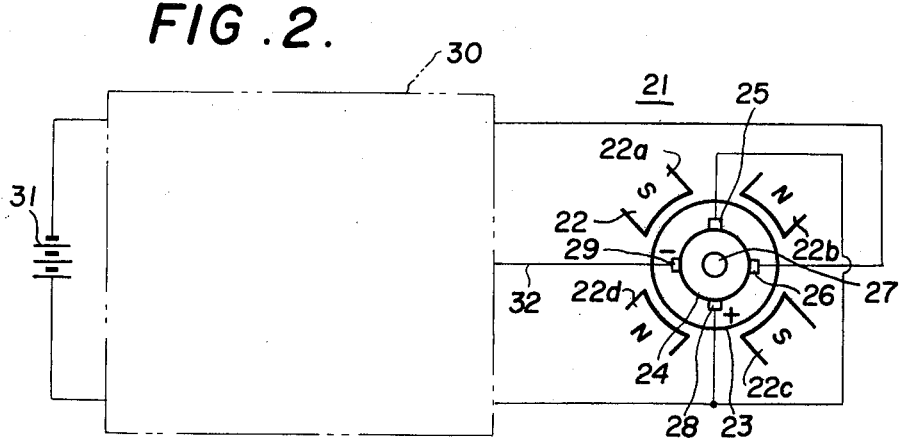
INVENTOR
HIROYUKI MORI
BY Kurt Kelman
AGENT United States Patent Office 3,512,068
Patented May 12, 1970

3,512,068
SPEED CONTROLLING APPARATUS FOR SMALL D.C. MOTOR
Horoyuki Mori, Yokohama, Japan, assignor to Nippon Electronics Co., Ltd., Tokyo, Japan, a corporation of Japan
Filed Apr. 18, 1967, Ser. No. 631,701
Claims priority, application Japan, Apr. 25, 1966, 41/25,870
Int. Cl. H02p 5/16
U.S. Cl. 318—331       1 Claim

ABSTRACT OF THE DISCLOSURE

A circuit for regulating the speed of a small D.C. motor by placing detecting brushes on the commutator in addition to the commutating brushes. The detected voltage from the additional brushes is used as the base voltage of a reference transistor which compares the detected voltage with a preset emitter voltage. Based on this comparison the reference transistor regulates the output of a control transistor connected across the electric source feeding the motor.

---

This invention relates to a speed controlling apparatus for small D.C. motors. More particularly, this invention relates to a novel construction of small conventional D.C. motors permitting a speed controlling apparatus to be applied to it. In accordance with the present invention, in a conventional small D.C. motor comprising a stator having at least two poles, a rotor, a commutator, commutating brushes, etc., detecting brushes for detecting voltage are provided on the commutator. The detecting brushes detect a secondary output voltage as a detecting voltage. This voltage is conducted from the rotor so as to regulate a speed controlling circuit which controls motor speed.

Heretofore, the small D.C. motor has employed a series characteristic system for varying the motor speed according to the load fluctuation. For keeping the motor speed constant, one method uses a means for operating an electric source with the contact point of a governor which is operated by the effect of centrifugal force. Another method for regulating a speed controlling circuit is by using the detecting voltage from the detecting generator associated with the rotor of the motor. However, the method using the governor is slow in switching operation during the speed fluctuation of the rotor since a response results relatively slowly. Using an attachment of a detecting generator makes the size of the device larger.

One object of the present invention is to provide a speed controlling apparatus having a simple construction yet keeping a high degree of accuracy in controlling the motor speed.

Another object of the present invention is to provide a speed controlling apparatus designed to combine with the conventional small D.C. motor so that a sensitive response of speed regulation and a small size of the device can be produced.

Further objects and features of the present invention will become more apparent with the following detailed description of embodiments, taken in conjunction with the accompanying drawing wherein:

FIG. 1 shows a wiring diagram of an embodiment of a speed controlling apparatus and a small D.C. motor according to the present invention.

FIG. 2 shows a wiring diagram of another embodiment of a speed controlling apparatus and a small D.C. motor according to the present invention.

Referring to FIG. 1, a small D.C. motor 1 comprises a stator having two poles 2, 2', a rotor 3, a commutator 4, commutating brushes 5, 6 and a rotating axis 7. The direct current to be supplied from an electric source 8 is forwarded to the commutating brushes 5, 6 through a speed controlling circuit 9 so that the rotor 3 is rotated. Detecting brushes 10, 11, having a different phase from the commutating brushes 5, 6, are respectively provided on the commutator 4 of the motor 1 separate from the commutating brushes 5, 6. With the connection as described, upon rotation of the motor 1, a D.C. voltage having opposite polarities, for example, a negative for the detecting brush 10, and a positive for the detecting brush 11, are detected at the detecting brushes 10, 11 as the suitable output voltage to a rotational ratio of the motor 1. The speed controlling circuit 9 is regulated by this output voltage serving as a detecting voltage.

In the speed controlling circuit 9, a collector, an emitter and a base of a controlling transistor 12 are respectively connected with the negative side of the electric source 8, the commutating brush 5 of the motor 1 and the collector of a reference transistor 13. Between the positive side of the electric source 8 and an emitter of the transistor 13, a standard voltage diode 14 like the Zener diode is so connected as to obtain the standard voltage VS. A moving piece 16 of a variable detecting resistor 15 is connected with the base of transistor 13. Between the collector of the transistor 12 and the collector of the transistor 13, a load resistor 17 is connected. Further, a bias resistor 18 is connected between the emitter of the transistor 12 and the emitter of the transistor 13. One end of the detecting resistor 15 is connected to the detecting brush 10, while the other end of the detecting resistor 15 is connected with the positive side of the electric source 8 which is additionally connected with the commutating brush 6 of the motor 1. In the embodiment, a variable resistor is used as the detecting register, however, any resistor can be utilized thereto. A condenser 19 connected across the detecting resistor in parallel is for smoothing the detecting voltage.

In most cases, the detecting voltage for supplying the speed controlling circuit 9 will be sufficient with the use of any voltage of one-side polarity. Accordingly, the detecting brush provided with the opposite polarity is connected to the electric source through a diode 20 for preventing a short circuit.

As described in the above, the features of the present invention for maintaining the rotational speed of the motor a constant, are to provide detecting brushes in addition to the commutating brushes on the commutator of the small D.C. motor. The rotational speed of the motor can thereby be kept at a constant by controlling the speed controlling circuit through the detecting voltages taken from the detecting brushes as a speed detecting signal. Consequently, when the motor 1 rotates at a constant speed, the detecting voltage output of the detecting brush 10 is maintained constant. With the circuit as described, the comparative value between the base voltage VB and the standard voltage VS of the emitter of the transistor 13 must be constant and therefore, the internal resistance of the transistor 12 can be constantly maintained. By sliding the moving piece of the detecting resistor 15 to a proper position, the internal resistor of the transistor 12 can be varied and the supplying voltage to the motor can be also regulated so that the rotational speed of the motor 1 may be set at any speed as desired.

In the case where the load against the motor becomes greater and the rotational speed of the motor becomes slower than the preset speed, the detecting voltage of the detecting brush 10 accordingly drops. In this case, the potential of the base of the transistor 12 is varied because the potential VB of the base of the transistor 13 is lowered and a large directional current flows between the base and the emitter of the transistor 33 whereby the current of the collector of the transistor 13 flows greatly.

Then, the internal resistance of the transistor 12 becomes low and the voltage-drop becomes small. The voltage to be supplied to the motor 1 from the electric source 8 increases to raise the rotational speed of the motor 1 so that the preset speed can be maintained.

On the other hand, when the load of the motor 1 becomes light and the rotational speed of the motor thereby becomes faster than the preset speed, the detecting voltage of the detecting brush 10 and the potential VB of the base of the transistor 13 respectively become larger. The directional current between the emitter and the base of the transistor 13 then becomes smaller so as to be in opposite directional potential against the standard voltage VS. Accordingly, the internal resistance of the transistor 12 becomes high and the voltage-drop becomes larger. The rotational speed of the motor 1 will therefore be slowed due to a decrease of the feed voltage to the motor from the electric source 8. The rotational speed of the motor will then be adjusted to the preset speed.

Further, by providing a thermistor in the motor and connecting it in series between the detecting brush and the detecting resistor, the speed fluctuation which results from the temperature change of the motor can be detected. The rotational speed of the motor can thereby be even more stabilized.

The embodiment of the motor having a stator with two poles has thus far been described. However, another embodiment of the motor having a stator with four poles will now be described with reference to FIG. 2.

In FIG. 2, a motor 21 comprises a stator 22 having four poles 22a, 22b, 22c, 22d, a rotor 23, a commutator 24, commutating brushes 25, 26 and a rotating axis 27.

Each pole to be provided in the stator 22 is arranged in such a manner wherein if the pole 22a is substituted by an S-pole, then poles 22b, 22d adjacent to the pole 22a will be an N-pole, while the pole 22c will be an S-pole.

On the commutating surface of the commutator 24, detecting brushes 28, 29 other than the commutating brushes 26, 25 are provided.

The commutating brush 25 is connected to the positive side of an electric source 31 through the speed controlling circuit 30 which corresponds to the speed controlling circuit 9 as previously described. Further, the brush 26 adjacent to the brush 25 is then connected to the negative side of the electric source 31 through the speed controlling circuit 30. The brush 29 is connected to the detecting circuit 32 of the speed controlling circuit 30 and the detecting brush 28 adjacent to the detecting brush 29 is connected to the electric source 31 which is common with the commutating brush 25.

If the direct current to be supplied from the electric source 31 is forwarded to the commutating brushes 25, 26 through the speed controlling circuit 30, the poles 22a, 22b of the stator 22 are in operation in the usual stator fashion and the rotor 23 is rotated, Upon the rotation of the rotor 23, the output D.C. voltage can be detected by the detecting brushes 28, 29 according to the rotational speed. In this case, the poles 22c, 22d of the stator 22 are operated as a generating stator.

Thus the rotor and the commutator of the motor are allowed to operate as a generator and the construction of which can be considered as a combination of a motor and a generator.

In this connection, the detecting voltage of the detecting brushes 28, 29 is larger in comparison with the embodiment mentioned in FIG. 1 so that the controlling ability of the speed controlling circuit 30 can be increased.

While this description has been in connection with the preferred embodiments of this invention, it will be obvious to those skilled in the art that various changes and modifications may be made therein without departing from the invention, and it is aimed, therefore, to cover in the appended claim all such changes and modifications as fall within the true spirit and scope of the invention.

I claim:
1. A speed controlling apparatus for small D.C. motors fed by an electrical source and equipped with a rotor, a stator, a commutator and commutating brushes, comprising signal detecting brushes coupled to said commutator and isolated electrically from said commutating brushes to produce a voltage signal proportional to motor speed, and a speed controlling circuit interposed between said electric source and said motor, the voltage to said motor from said electric source being varied by said detected voltage controlling circuit, and said speed controlling circuit comprising a controlling transistor connected between said electric source and said commutating brushes, a reference transistor having an emitter, a base and a collector, a voltage diode across which is a standard voltage, said emitter being grounded through said voltage diode, a detecting resistor connected across said detecting brushes, said base connected to said detecting resistor, and said collector connected to said controlling transistor, whereby said reference transistor compares said detected voltage with said standard voltage to regulate said controlling transistor.

References Cited

UNITED STATES PATENTS

| | | | |
|---|---|---|---|
| 2,474,830 | 7/1949 | Curry | 318—331 |
| 3,250,979 | 5/1966 | Shaw | 318—331 |
| 3,309,596 | 3/1967 | Limley | 318—331 |
| 3,360,705 | 12/1967 | Morris | 318—331 |
| 3,377,536 | 4/1968 | Bacquart | 318—331 |
| 3,396,323 | 8/1968 | Auld | 318—331 |

ORIS L. RADER, Primary Examiner

L. L. HEWITT, Assistant Examiner